United States Patent [19]
Hirota et al.

[11] Patent Number: 5,201,802
[45] Date of Patent: Apr. 13, 1993

[54] EXHAUST GAS PURIFICATION SYSTEM FOR AN INTERNAL COMBUSTION ENGINE

[75] Inventors: Shinya Hirota, Susono; Kenji Katoh, Shizuoka, both of Japan

[73] Assignee: Toyota Jidosha Kabushiki Kaisha, Toyota, Japan

[21] Appl. No.: 829,212

[22] Filed: Jan. 31, 1992

[30] Foreign Application Priority Data

Feb. 4, 1991 [JP] Japan .................................. 3-033366
Feb. 20, 1991 [JP] Japan .................................. 3-045662

[51] Int. Cl.$^5$ .............................................. F01N 3/20
[52] U.S. Cl. .................................... 60/276; 60/277; 60/285; 60/287; 60/298; 60/300; 60/301
[58] Field of Search ............... 60/276, 277, 285, 287, 60/298, 300, 301

[56] References Cited

U.S. PATENT DOCUMENTS

| | | | |
|---|---|---|---|
| 3,882,451 | 5/1975 | Fujishiro et al. | 60/277 |
| 4,079,714 | 3/1978 | Saito | 123/198 E |
| 4,729,220 | 3/1988 | Terasaka et al. | 60/277 |
| 4,912,928 | 4/1990 | Kaneko et al. | 60/298 |

FOREIGN PATENT DOCUMENTS

| | | |
|---|---|---|
| 0433772 | 6/1991 | European Pat. Off. . |
| 0441401 | 8/1991 | European Pat. Off. . |
| 63-283727 | 11/1986 | Japan . |
| 62-251415 | 2/1987 | Japan . |
| 1-216009 | 3/1989 | Japan . |
| 1-130735 | 5/1989 | Japan . |
| 1-135541 | 5/1989 | Japan . |
| 3-54343 | 3/1991 | Japan . |

*Primary Examiner*—Ira S. Lazarus
*Assistant Examiner*—L. Heyman
*Attorney, Agent, or Firm*—Kenyon & Kenyon

[57] ABSTRACT

An exhaust gas purification system for an internal combustion engine includes an engine capable of fuel combustion at lean air-fuel ratios, a catalyst constructed of zeolite carrying at least one metal selected from the transition metals and noble metals to reduce NOx under oxidizing gas conditions and in the presence of HC. The exhaust gas purification system also includes a device for determining degradation of the catalyst, and a device for increasing the amount of HC or changing a catalyst temperature to a higher side when it is determined that the catalyst has been degraded. The NOx purification rate of the catalyst is maintained high even after the catalyst has been degraded.

22 Claims, 12 Drawing Sheets

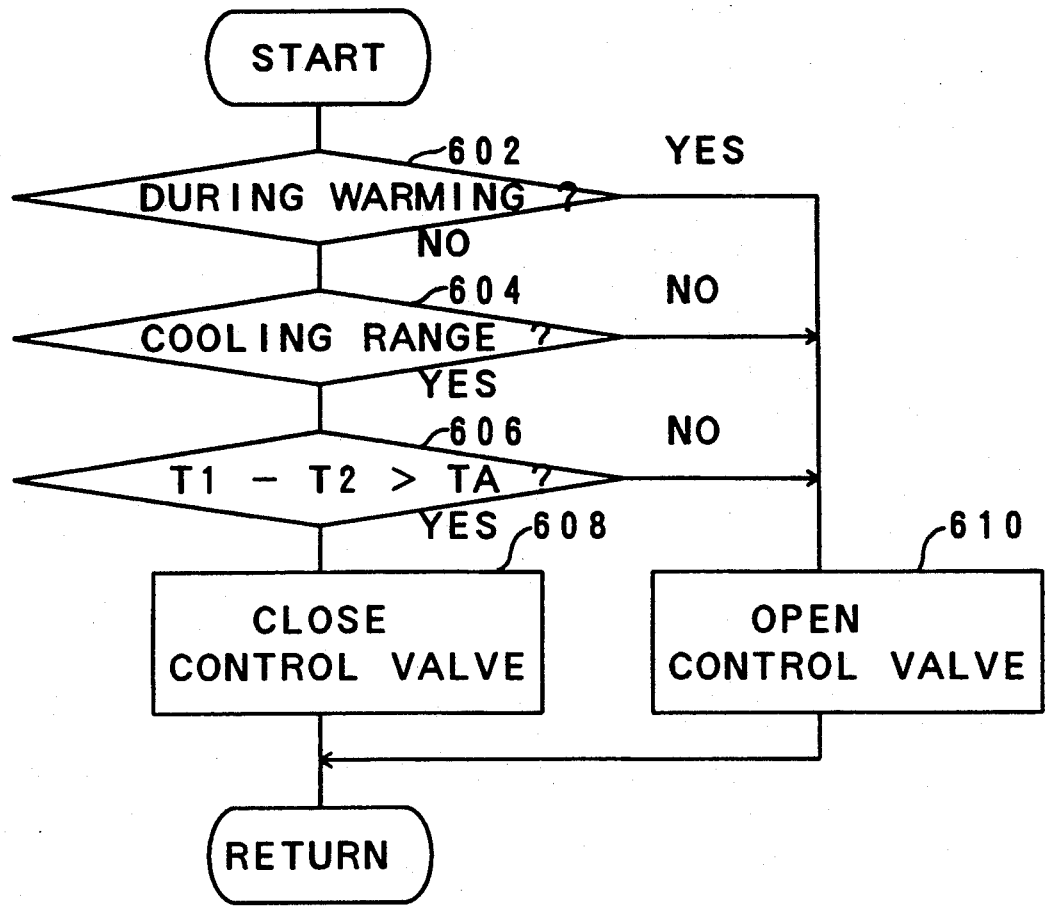
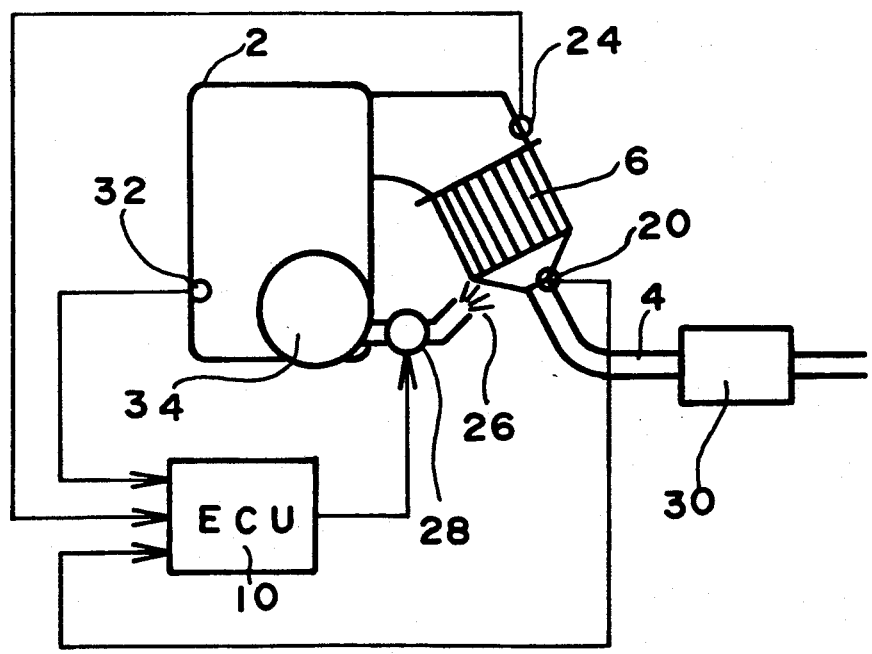

EXHAUST GAS PURIFICATION SYSTEM FOR AN INTERNAL COMBUSTION ENGINE

BACKGROUND OF THE INVENTION

1. Field of the Invention

The present invention relates to an exhaust gas purification system for an internal combustion engine provided with a zeolite-type NOx reduction catalyst in an exhaust conduit of the engine wherein a high NOx purification rate of the catalyst can be obtained even after the catalyst has been degraded.

2. Description of the Prior Art

Carbon dioxide ($CO_2$) exhausted from automobile engines is desired to be reduced for environmental protection, and fuel combustion of engines at lean air-fuel ratios (lean burn) is one solution therefor. However, since a conventional three-way catalyst cannot reduce nitrogen oxides (NOx) included in the exhaust gas from the lean burn engine, it is a problem how to decrease the amount of NOx exhausted from the engine to the environment.

As a catalyst capable of reducing NOx under oxidizing gas conditions (exhaust gas conditions of the lean burn engine), a catalyst constructed of zeolite carrying transition metals and reducing NOx in the presence of hydrocarbons (HC) is disclosed in, for example, Japanese Patent Publications HEI 1-130735 and HEI 1-135541.

However, with the zeolite catalyst, there is a problem that the catalyst tends to undergo thermal degradation which makes it impossible to utilize the catalyst effectively.

SUMMARY OF THE INVENTION

An object of the invention is to provide an exhaust gas purification system for an internal combustion engine with a zeolite catalyst installed in an exhaust conduit of the engine, wherein the zeolite catalyst can still operate with a considerably high NOx purification rate (NOx conversion) even after the catalyst has been thermally degraded.

The above-described object is attained by an exhaust gas purification system for an internal combustion engine in accordance with the present invention. The exhaust gas purification system includes an internal combustion engine capable of fuel combustion at lean air-fuel ratios and having an exhaust conduit, and a catalyst installed in the exhaust conduit of the engine. The catalyst may be constructed of zeolite carrying at least one metal selected from the group consisting of transition metals and noble metals to reduce nitrogen oxides included in exhaust gas from the engine under oxidizing gas conditions and in the presence of hydrocarbons (such catalyst may be called a lean NOx catalyst hereinafter). The exhaust gas purification system further includes means for determining degradation of the catalyst, and means for increasing the amount of hydrocarbons supplied to the catalyst when the means for determining degradation of the catalyst determines that the catalyst has been degraded (This system will be explained as first through third embodiments of the invention hereinafter.)

In above, the means for increasing the amount of hydrocarbons can be substituted by or may be used together with means for changing a catalyst temperature to a higher temperature side when the means for determining degradation of the catalyst determines that the catalyst has been degraded. (This system will be explained as fourth through six embodiments of the invention hereinafter.)

An NOx reduction mechanism of the lean NOx catalyst is presumed to be a reaction of radicals generated through partial oxidation of HC with NOx. Therefore, if the amount of HC included in the exhaust gas is increased, the amount of radicals will increase and the NOx purification rate of the lean NOx catalyst will be increased.

In the present invention, the means for determining degradation of the catalyst determines the extent of degradation of the catalyst and increases the amount of HC supplied to the catalyst in accordance with the degradation extent of the catalyst. As a result, even if the lean NOx catalyst is thermally degraded to make the reaction of the radicals with NOx less active, the supply amount is increased in proportion to the degradation extent and therefore the amount of radicals is increased, so that decrease of the NOx purification rate is suppressed and the NOx purification rate may be increased. In this instance, since the amount of HC is increased in accordance with the degradation extent of the lean NOx catalyst, the increased amount of HC will be optimum to minimize HC consumption.

Since a temperature range where the lean NOx catalyst can operate with a high NOx purification rate shifts to a higher temperature side in accordance with degradation of the catalyst, decrease of the NOx purification rate of the lean NOx catalyst can be effectively suppressed by changing the catalyst temperature to a high temperature side using the means for changing the catalyst temperature.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which:

FIG. 19 is a flow chart for changing a catalyst temperature by controlling the amount of cooling wind in accordance with the sixth embodiment of the present invention; and FIG. 20 is a schematic system diagram of an exhaust gas purification system for an internal combustion engine in accordance with the sixth embodiment of the present invention.

DETAILED DESCRIPTION OF THE PREFERRED EMBODIMENTS

Six embodiments of the invention will be explained. The first through third embodiments include means for increasing the amount of HC as an essential element thereof, and the fourth through sixth embodiments include means for changing the catalyst temperature as an essential element thereof.

Further, the first embodiment, which includes means for determining degradation of a catalyst based on an accumulated running distance of an automobile, is illustrated in FIGS. 1-7. The second embodiment, which includes means for studying and determining degradation of a catalyst based on an accumulated running distance, is illustrated in FIGS. 6 and 8-13. The third embodiment, which includes means for determining degradation of a catalyst based on a temperature difference between the inlet gas and the outlet gas of the catalyst, is illustrated in FIGS. 6 and 14-18. The fourth embodiment, which includes means for determining degradation of a catalyst based on an accumulated running distance of an automobile, is illustrated in FIGS. 1-7. The fifth embodiment, which includes means for studying and determining degradation of a catalyst based on an accumulated running distance, is illustrated in FIGS. 6 and 8-13. The sixth embodiment includes means for changing a catalyst temperature by controlling the amount of cooling wind and is illustrated in FIGS. 19 and 20.

FIRST EMBODIMENT

Figure 6:
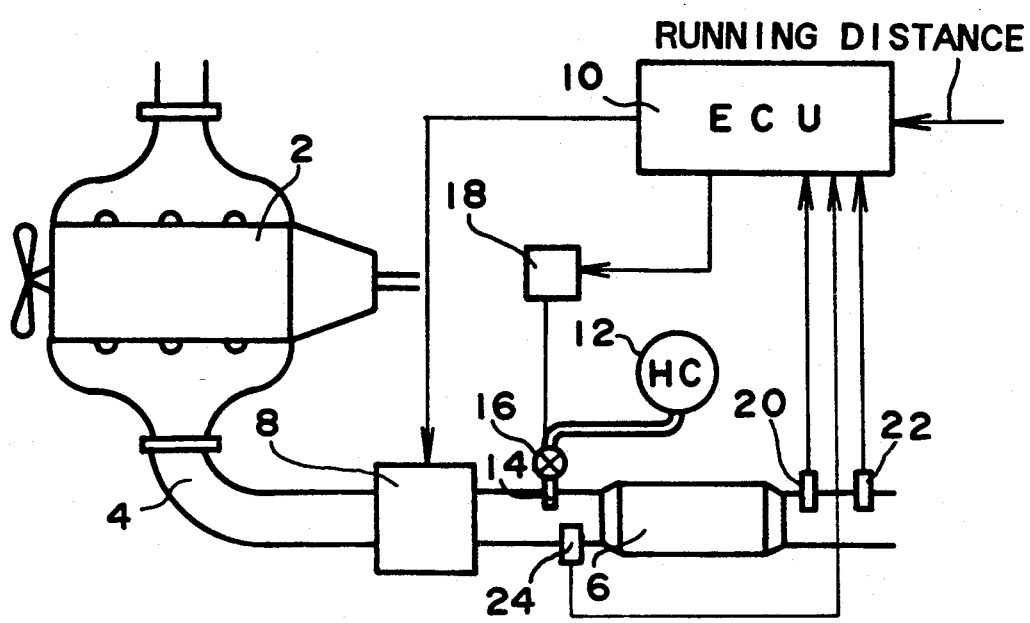
FIG. 6 is a schematic system diagram of an exhaust gas purification system for an internal combustion engine in accordance with the first through fifth embodiments of the present invention.
Figure 7:
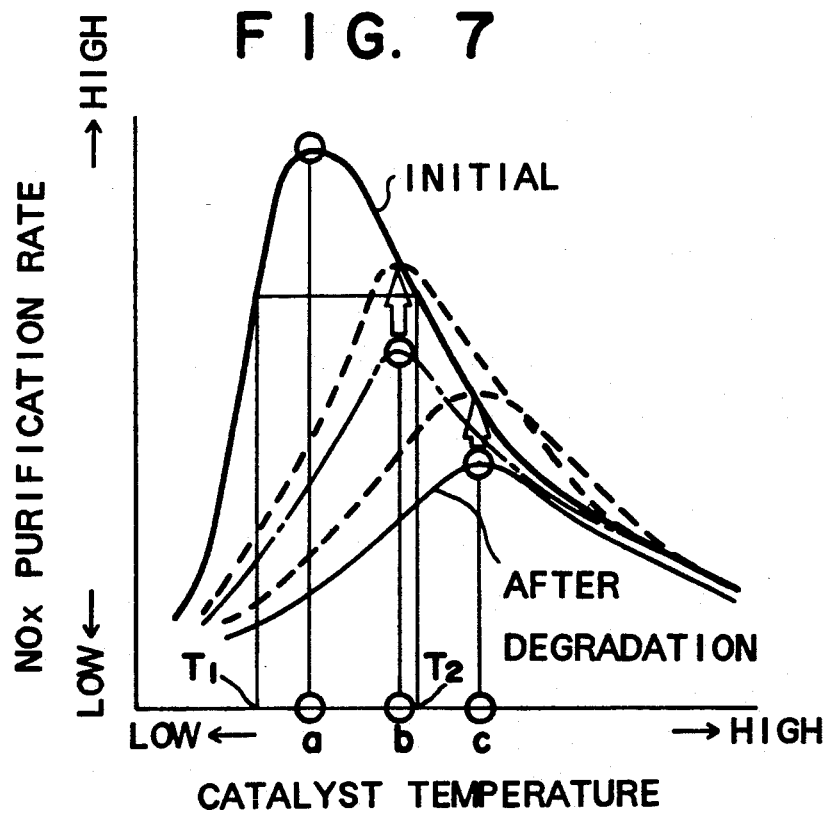
FIG. 7 is a graph illustrating a NOx purification rate (NOx conversion) versus lean NOx catalyst temperature (or exhaust gas temperature) characteristic.

As illustrated in FIG. 6, an engine 2 capable of fuel combustion at lean air-fuel ratios (lean burn engine) has an exhaust conduit 4 where a lean NOx catalyst 6 is installed. An exhaust gas temperature control device 8 is installed in a portion of the exhaust conduit upstream of the lean NOx catalyst 6. When the exhaust gas temperature changes, a catalyst temperature of the lean NOx catalyst 6 changes according to the change in the exhaust gas temperature. A portion of engine cooling water is lead to the exhaust gas temperature control device 8 and the circulation amount of cooling water is controlled by a control valve so that the exhaust gas temperature control device 8 can control the exhaust gas temperature. The engine cooling water-type exhaust gas temperature control device 8 may be replaced by other-type exhaust gas temperature control devices. For example, a device using introduction of secondary air (if the secondary air is introduced into the exhaust gas, the exhaust gas temperature is lowered), a device using an air-fuel ratio control (if the air-fuel ratio is changed to a richer side in a lean air-fuel ratio range, the exhaust gas temperature rises), or a device using an ignition timing control (if the ignition timing is advanced, the exhaust gas temperature is lowered up to a certain ignition timing and then rises at further advanced ignition timings) may be employed. In the case of diesel engines, the exhaust gas temperature control device 8 may be replaced by a device using a charging pressure control (if the charging pressure is increased, the exhaust gas temperature lowers), and a device using an intake throttle valve control (if an opening degree of the intake throttle valve is made large, the exhaust gas temperature lowers). The operation of the exhaust gas temperature control device 8 is controlled by an electronic control unit (ECU) 10.

In the portion of the exhaust conduit 4 upstream of the lean NOx catalyst 6, a hydrocarbon supply device (HC supply device) is provided. The HC supply device includes a hydrocarbon source (HC source) 12, a hydrocarbon supply port (HC supply port) 14 for introducing the HC from the HC source 12 into the portion of the exhaust conduit 4 upstream of the lean NOx catalyst 6, and a control valve (HC control valve) 16 for controlling the amount of HC supplied into the exhaust conduit 4. The control valve 16 is driven by a valve drive device 18 which is controlled by the ECU 10.

A first exhaust gas temperature sensor 24 is installed in the portion of the exhaust conduit upstream of the lean NOx catalyst 6, and a second exhaust gas temperature sensor 20 is installed in a portion of the exhaust conduit downstream of the lean NOx catalyst 6. Further, an NOx sensor 22 is installed in the portion of the exhaust conduit downstream of the lean NOx catalyst 6.

The output signals of these sensors 20, 24, and 22 are fed to the ECU 10. Also, a signal of a running distance of the automobile to which the engine 2 is mounted, and signals of an engine load and an engine speed are fed to the ECU 10.

The ECU 10 is constituted by a micro-computer which includes an input interface, an output interface, an analog/digital converter for converting analog signals to digital signals, a read-only memory (ROM), a random access memory (RAM), and a central processor unit (CPU) for conducting calculation. The ROM stores the flow charts and maps of FIGS. 1-5, and the calculations are executed in the CPU.

Figure 1:
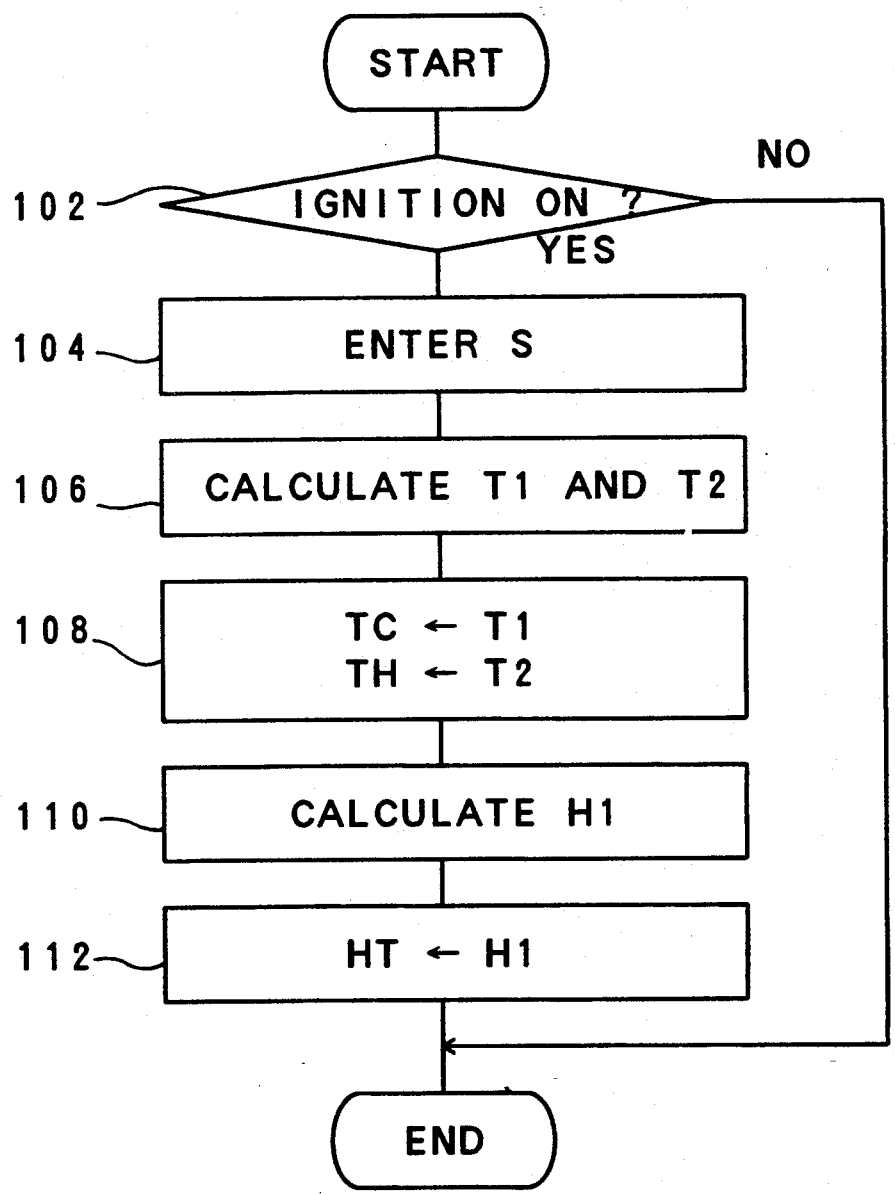
FIG. 1 is a flow chart for determining degradation of a lean NOx catalyst for an exhaust gas purification system for an internal combustion engine in accordance with a first embodiment of the present invention.

FIG. 1 illustrates a routine for determining a degradation extent of the lean NOx catalyst 6 and constitutes means for determining degradation of the catalyst 6. This routine is entered at intervals of predetermined periods of time, for example, at intervals of fifty milliseconds.

Figure 2:
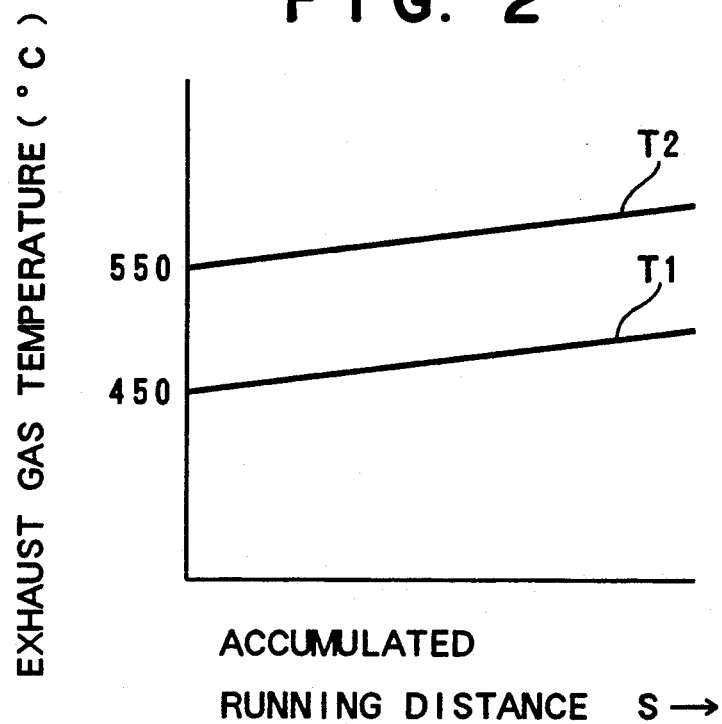
FIG. 2 is a graphical representation of a map of exhaust gas temperature versus accumulated running distance used in calculation by the flow chart of FIG. 1.

At step 102, it is determined whether or not the ignition switch is turned on. If the ignition switch is in an OFF state, the routine proceeds to a return step because it is necessary to determine degradation of the catalyst. If the ignition switch is in an ON state at step 102, the routine proceeds to step 104, where an accumulated running distance S of the automobile, to which the engine 2 is mounted, is calculated. Then, at step 106, a lower temperature limit T1 and an upper temperature limit T2 of a temperature range where the lean NOx catalyst 6 can operate with a high NOx purification rate are calculated so as to correspond to the calculated running distance S using the map of FIG. 2. As illustrated in FIG. 2, the values of T1 and T2 increase in accordance with the degradation extent of the lean NOx catalyst, that is, an increase in the accumulated running distance S. The T1 and T2 shown in FIG. 7 correspond to those of the lean NOx catalyst at an initial state. When the lean NOx catalyst 7 is degraded, the temperature where the lean NOx catalyst 6 operates with a maximum NOx purification rate shifts to a higher temperature side, from a to b and from b to c in FIG. 7. Then, the routine proceeds to step 108, where a lower limit TC of an object exhaust gas temperature range is replaced by T1 and an upper limit TH of the object exhaust gas temperature range is replaced by T2.

Figure 3:
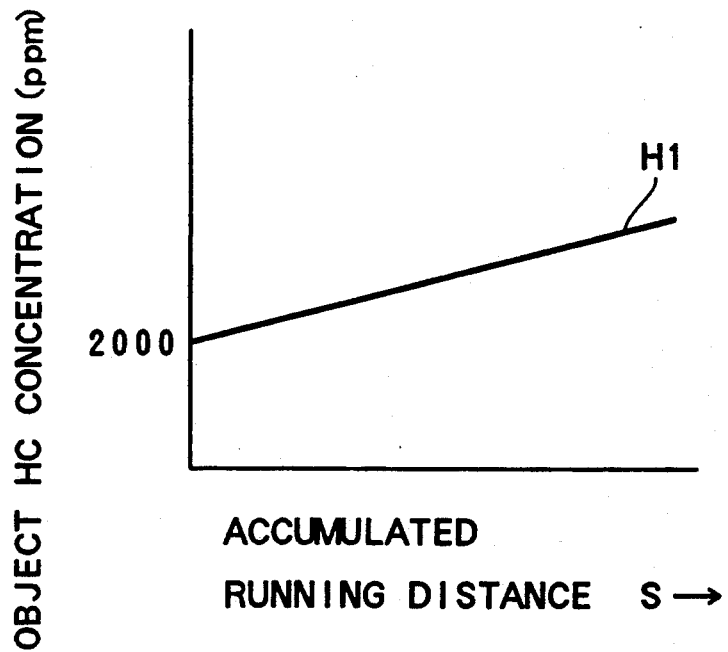
FIG. 3 is a graphical representation of a map of object HC concentration versus accumulated running distance used in calculation by the flow chart of FIG. 1.

The routine further proceeds to step 110, where an object hydrocarbon concentration H1 is calculated based on the calculated accumulated running distance S using FIG. 3. When the accumulated running distance increases and the degradation extent of the lean NOx catalyst 6 increases, the object amount of HC supplied to the lean NOx catalyst 6 should be increased, as shown in FIG. 3, so that the radicals generated through partial oxidation of HC are increased to suppress a decrease in the NOx purification rate of the lean NOx catalyst 6. Then, at step 112, an HC concentration HT, according to which the opening degree of HC control valve 16 is operated, is replaced by the increased H1, and then the routine returns.

Figure 4:
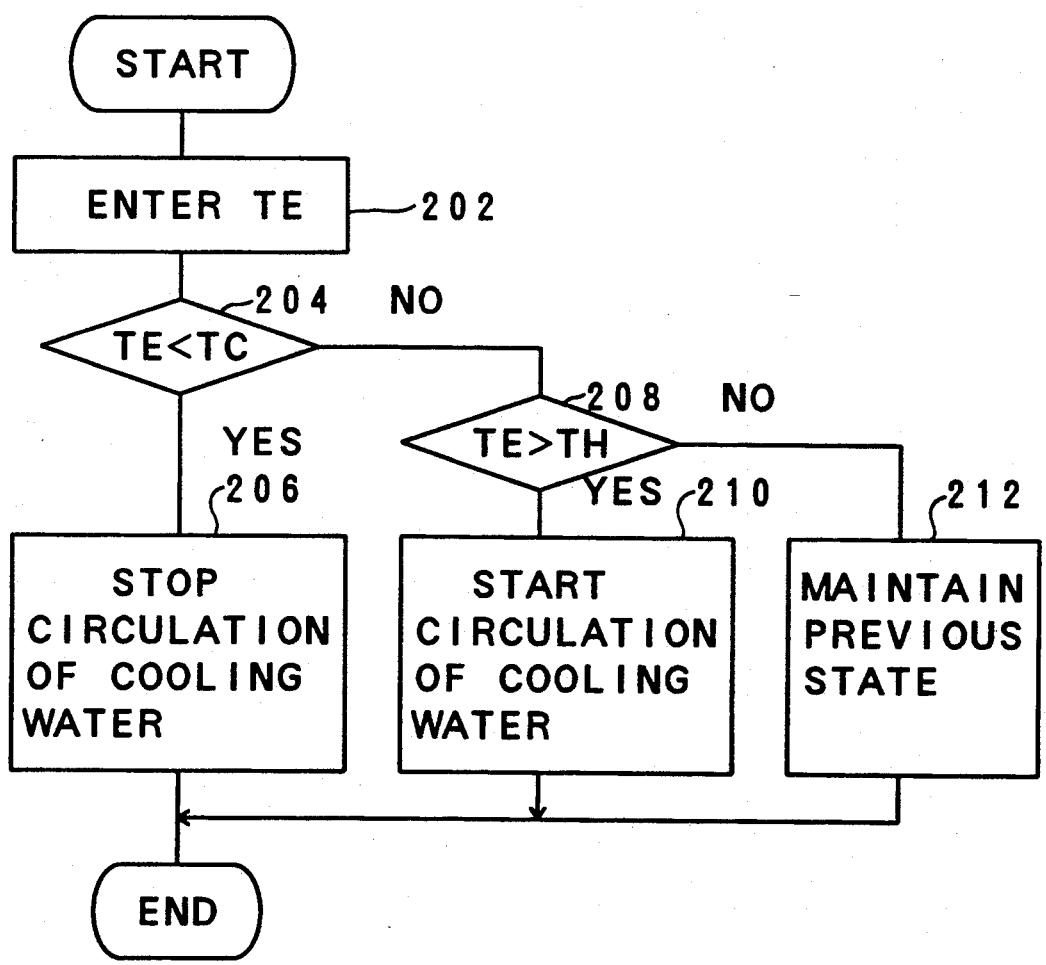
FIG. 4 is a flow chart for changing a catalyst temperature for an exhaust gas purification system for an internal combustion engine in accordance with the first embodiment of the present invention and is applicable to a fourth embodiment of the present invention.
Figure 5:
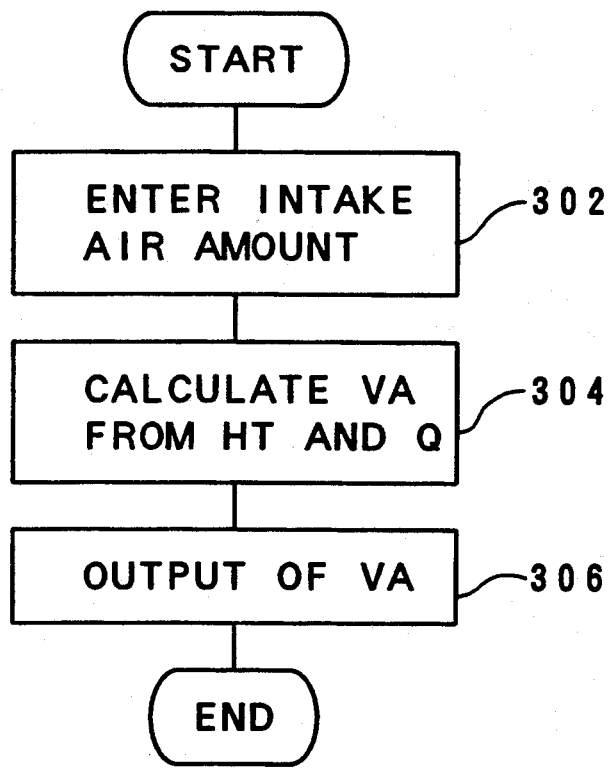
FIG. 5 is a flow chart for increasing the amount of HC for an exhaust gas purification system for an internal combustion engine in accordance with the first embodiment of the present invention and is applicable to the second and third embodiments and the fourth through sixth embodiments of the present invention.

When the data TC, TH, and HT have been calculated in the routine of FIG. 1, the catalyst temperature is controlled using the routine of FIG. 4 and the HC amount is increased using the routine of FIG. 5. In this instance, the routine of FIG. 4 is not essential in the first embodiment, but the routine of FIG. 5 is essential in the first embodiment.

In the routine of FIG. 4, a current exhaust gas temperature TE (an output of the exhaust gas temperature sensor 20) is entered at step 202. Then, at step 204, it is determined whether or not the exhaust gas temperature TE is lower than the lower limit TC of the object temperature range calculated in FIG. 1. When TE is lower than TC, it is necessary to increase the exhaust gas temperature and the routine proceeds to step 206 where circulation of the engine cooling water to the exhaust gas temperature control device 8 is stopped. When TE is equal to or higher than TC at step 204, the routine proceeds to step 208, where it is determined whether or not the current exhaust gas temperature TE is higher than the upper limit TH of the object temperature range. If TE is higher than TH, it is necessary to lower the exhaust gas temperature, and the routine proceeds to step 210 where the engine cooling water is circulated to the exhaust gas temperature control device 8. When TE is equal to or lower than TH, TE is between TC and TH and there is no need to control the exhaust gas temperature. Therefore, the routine proceeds to step 212 where the previous state is maintained and then the routine returns. The routine of FIG. 4, the steps 106 and 108 of FIG. 1, and the map of FIG. 3, constitute means for changing the catalyst temperature (which corresponds to the exhaust gas temperature) to a richer side when the lean NOx catalyst 6 has been degraded.

FIG. 5 illustrates a routine for increasing the amount of HC. This routine is entered at intervals of predetermined periods of time, for example, at intervals of fifty milliseconds. At step 302, an intake air amount or quantity Q is entered. Then, at step 304, an object opening degree VA of the HC control valve 16 is calculated based on the intake air amount Q and the calculated object HC concentration HT using a predetermined Q versus HT map so that the higher the HC concentration HT is the larger the opening degree VA of the HC control valve 16 is. Further, the larger the intake air amount Q is, the larger the opening degree VA of the HC control valve 16 is. Then, at step 306, the output VA is sent to the actuator of the HC control valve 16 so that the opening degree of the HC control valve 16 is adjusted to the opening degree VA. In this HC supply amount control, when the lean NOx catalyst 6 is thermally degraded, the HT value is made large at step 112 of FIG. 1, and the amount of HC supplied to the lean NOx catalyst 6 is increased by the routine of FIG. 5, so that decrease of the NOx purification rate of the lean NOx catalyst 6 is suppressed or the NOx purification rate is increased. More particularly, even if the reaction of HC and NOx is decreased due to degradation of the lean NOx catalyst 6, the amount of HC supplied to the lean NOx catalyst 6 is increased so that the NOx purification rate is increased as shown by the broken line of FIG. 7. In this instance, the step 110 of FIG. 1, FIG. 3, and the routine of FIG. 5 constitutes the means for increasing the HC amount.

Operation with respect to the first embodiment will now be explained.

When it is determined, based on the accumulated running distance, that the lean NOx catalyst 6 has been degraded, the HC amount is increased by the means for increasing the HC amount in accordance with the degradation extent of the lean NOx catalyst 6. The more degraded the catalyst 6 is, the less the NOx purification rate of the catalyst 6 is, and the more the HC amount supplied to the catalyst 6 is, the more the NOx purification rate of the catalyst 6 is. Therefore, even if the NOx purification characteristic shifts from a to b, and from b to c in FIG. 7, due to degradation of the catalyst 6, the characteristic line is raised, as shown by a broken line in FIG. 7, by increasing the amount of HC supplied to the catalyst 6.

Further, if the catalyst temperature is changed to a higher side, using the routine of FIG. 4 together with the above-described HC amount increase, the NOx purification rate of the lean NOx catalyst 6 is further increased. More particularly, even if the lean NOx catalyst is degraded, accompanied by a shift of the NOx purification rate peak temperature, to a higher temperature side, the catalyst temperature also is changed to the higher side corresponding to the degradation extent of the catalyst 6, so that the lean NOx catalyst 6 is always used at or near its NOx purification rate peak temperature and the NOx purification ability of the lean NOx catalyst 6 can be extracted for a long period of time.

SECOND EMBODIMENT

The second embodiment differs from the first embodiment with regard to the means for determining degradation of the lean NOx catalyst 6. Further, in the second embodiment, the means for changing, the catalyst temperature includes means for changing a catalyst temperature using an ignition timing control. Since structures of other portions, and the operation of the other portions, are the same as those of the first embodiment, only the portions different from the first embodiment will be explained below.

Figure 8:
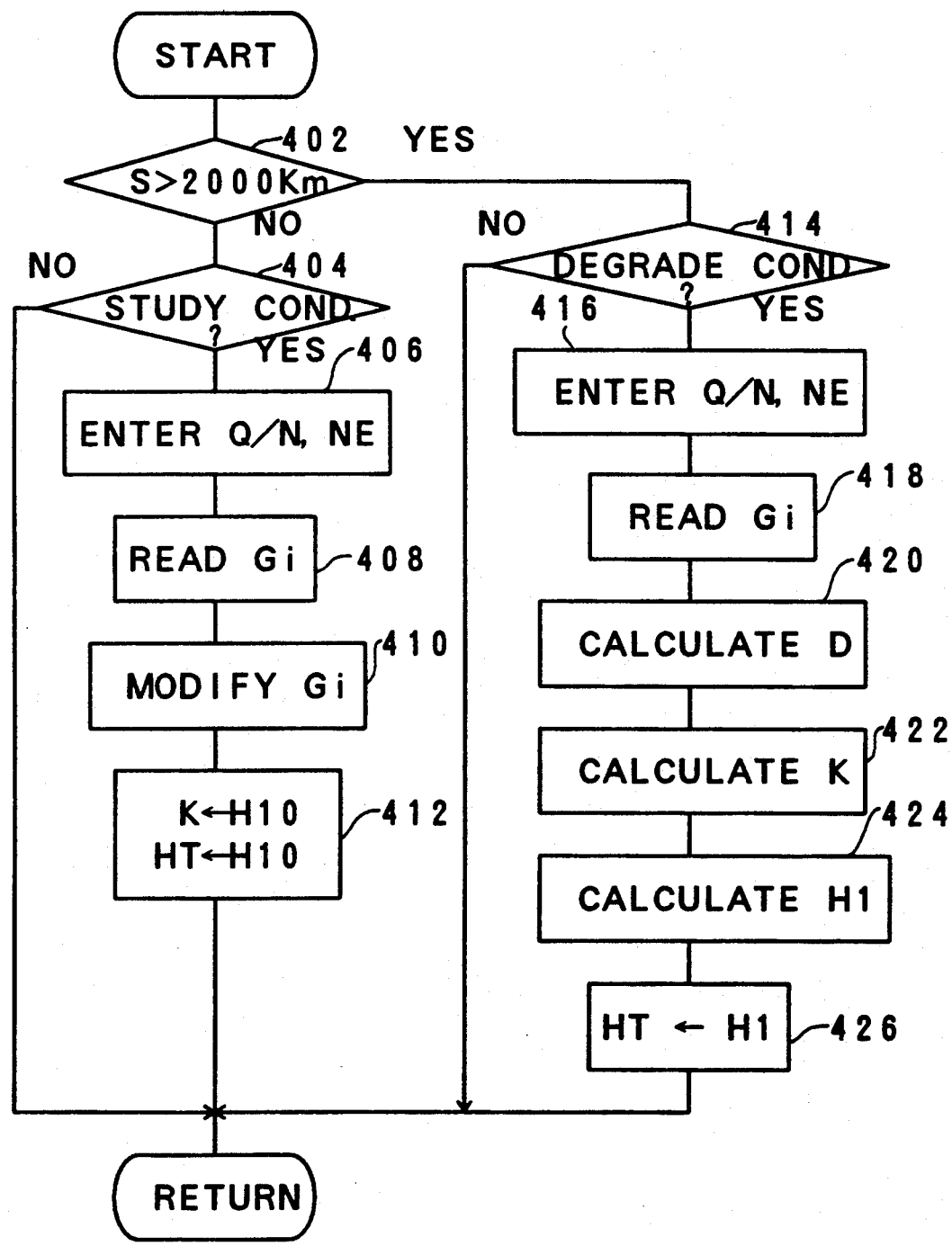
FIG. 8 is a flow chart for determining degradation of a lean NOx catalyst for an exhaust gas purification system for an internal combustion engine in accordance with the second embodiment of the present invention and is applicable to the fifth embodiment of the invention.
Figure 9:
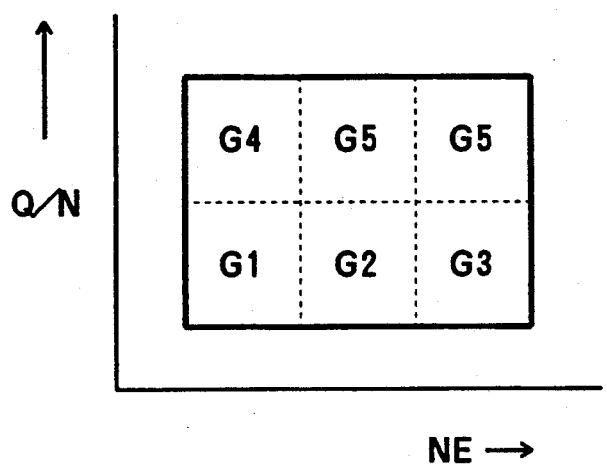
FIG. 9 is a graphical representation of a map of engine load versus engine speed used in calculation by the flow chart of FIG. 8.

FIG. 8 illustrates a routine for studying and determining degradation of the lean NOx catalyst 6. This routine is entered at intervals of predetermined periods of time, for example, at intervals of fifty milliseconds. At step 402, it is determined whether or not the accumulated running distance exceeds a predetermined value S, for example, 2,000 km. When the accumulated running distance is less than the predetermined value S, it can be presumed that the catalyst 6 is not yet degraded, and the routine proceeds to step 404 and the subsequent steps where the current output of the NOx sensor is studied and stored. When the accumulated running distance exceeds the predetermined value S, the catalyst 6 is deemed to have been degraded, and the routine proceeds to step 414 and the subsequent steps where the degradation extent of the catalyst 6 is calculated by a difference of the current output of the NOx sensor and the stored value. Then, the HC amount is increased corresponding to the degradation extent of the catalyst 6.

More particularly, at step 404, where it is determined whether or not a catalyst degradation studying condition is satisfied, for example, whether or not the current engine operating condition is in a warmed-up and usual running condition. If the current condition is not in the catalyst degradation studying condition, the routine returns, and if the current condition is in the catalyst degradation studying condition, the routine proceeds to step 406. At step 406, the current operating conditions, for example, the current engine load Q/N and the current engine speed NE are entered. Then, at step 408, the stored NOx sensor output Gi corresponding to the current engine operating conditions is found using the map of engine load versus engine speed of FIG. 9. Then, at step 410, the stored NOx sensor output Gi is gradually modified by the current output N of the NOx sensor 22 using the equation (N+9*Gi)/10 and this modified value is stored as Gi in the RAM of the ECU 10. Then, at step 412, a temperature modification factor K which will be used in a routine of FIG. 12 is set to 0 and an HC concentration HT used in the routine of FIG. 5 is set to a basic HC concentration H10 which will be obtained in FIG. 11.

The routine then proceeds from step 402 to step 414. At step 414 a determination is made as to whether or not a catalyst degradation determining condition is satisfied, for example, whether or not the current engine operating condition is in a warmed-up and usual running condition. If the current condition is not in the catalyst degradation determining condition, the routine returns, and if the current condition is in the catalyst degradation determining condition, the routine proceeds to step 416. At step 416, the current engine load Q/N and the current engine speed NE are entered. Then, at step 418, the Gi value corresponding to the engine operating condition is read from the studied and stored Gi values. Then, at step 420, from the current NOx sensor output N (after the catalyst degradation) and the read Gi value (before the catalyst degradation), a NOx purification rate decrease extent D is calculated using the equation D=N−Gi. The above-described steps 402–420 and FIG. 9 constitute the means for determining degradation of the lean NOx catalyst 6 in the second embodiment.

Figure 10:
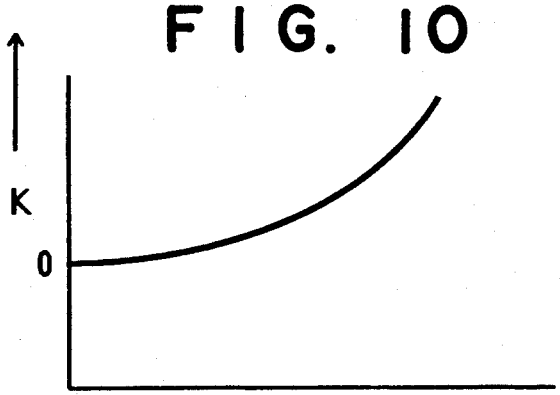
FIG. 10 is a graphical representation of a map of temperature modification factor versus purification rate decrease extent used in calculation by the flow chart of FIG. 8.
Figure 11:
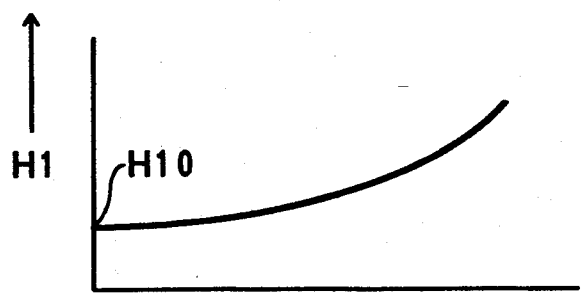
FIG. 11 is a graphical representation of a map of HC concentration versus purification rate decrease extent used in calculation by the flow chart of FIG. 8.

Then, at step 422, a catalyst temperature modification factor K is calculated from the NOx purification rate decrease extent D using a map of K versus D of FIG. 10. As shown in FIG. 10, the larger the value D is, the larger the factor K is. Then, at step 424, an object HC concentration H1 is calculated using a map of H1 versus D of FIG. 11. In FIG. 11, the larger the value D is, the larger the object concentration H1 is. The initial value of H1 is H10. Then, the routine proceeds to step 426, where HT is replaced by the calculated value H1, and then the routine returns. The above-described steps 424 and 426 and FIGS. 11 and 5 constitute the means for increasing the amount of HC supplied to the lean NOx catalyst 6 in the second embodiment.

Figure 12:
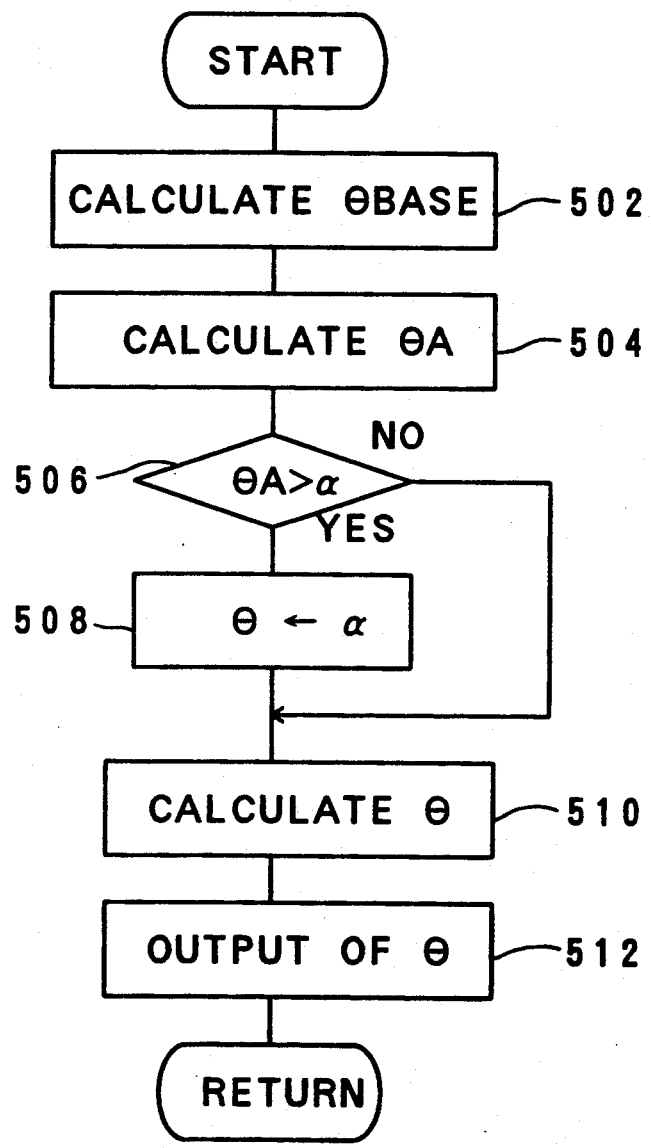
FIG. 12 is a flow chart for changing a catalyst temperature for an exhaust gas purification system for an internal combustion engine in accordance with the second embodiment of the present invention and is applicable to the fifth embodiment of the present invention.
Figure 13:
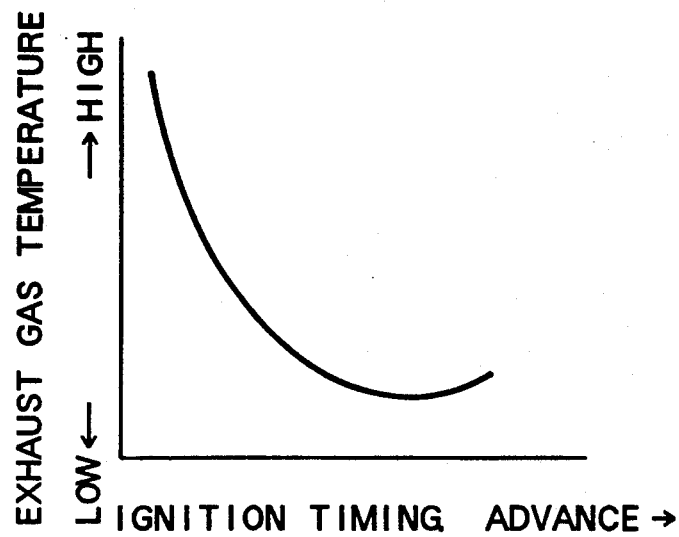
FIG. 13 is a graphical representation of a map of exhaust gas temperature versus ignition timing used in calculation by the flow chart of FIG. 12.

FIG. 12 illustrates a routine for ignition timing control for changing the catalyst temperature in the second embodiment. Since there is a relationship between ignition timing and exhaust gas temperature as shown in FIG. 13, the catalyst temperature is controlled by the ignition timing in the second embodiment.

The routine of FIG. 12 is entered at intervals of predetermined crank angles, for example at intervals of 30° crank angles. At step 502, a basic ignition timing $\theta$BASE is calculated from the current engine load Q/N and the current engine speed NE. Then, at step 504, an ignition timing advance amount $\theta$A is calculated from the equation $\theta A = K^* M_N$, where $M_N$ is a constant and K is catalyst temperature modification factor calculated in the routine of FIG. 8. Then, at steps 506 and 508, the value $\theta$A is restricted to a value equal to or less than a predetermined value, alpha. Then, the routine proceeds to step 510, where an object ignition timing $\theta$ is calculated using the equation $\theta = \theta BASE + \theta A$. Then, at step 512, the ignition timing $\theta$ is executed, and then the routine returns. In this instance, when the value K is large, the value $\theta$ is also large, so that the exhaust gas temperature and the catalyst temperature are high. The above-described step 422 of FIG. 8, the map of FIG. 10, and the routine of FIG. 12 constitute the means for changing the catalyst temperature to a higher side when the lean NOx catalyst 6 has been degraded in the second embodiment.

THIRD EMBODIMENT

The third embodiment differs from the first embodiment only in the means for determining degradation of the lean NOx catalyst 6. Since the structure of the other portions and the operation of the other portions are the same as those of the first embodiment, only the portions different from those of the first embodiment will be explained below.

Figure 14:
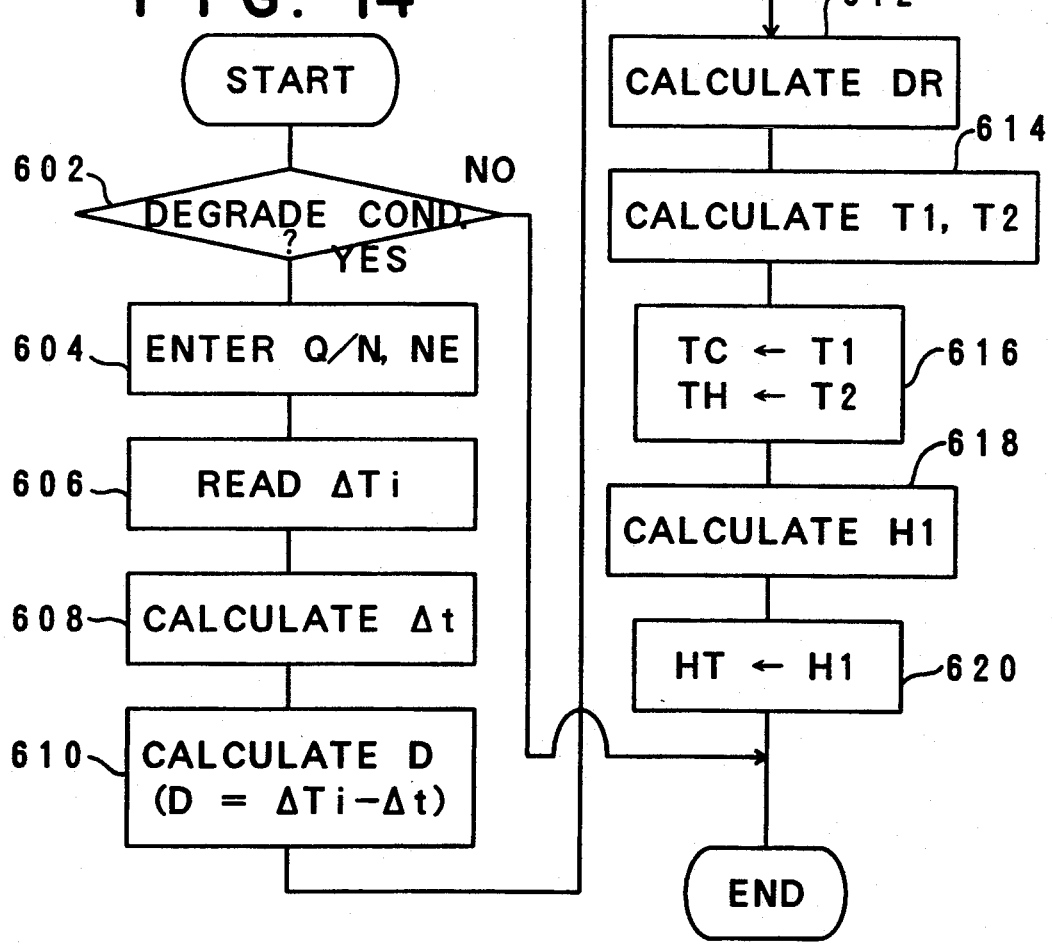
FIG. 14 is a flow chart for determining degradation of a lean NOx catalyst in accordance with the third embodiment of the present invention.
Figure 15:
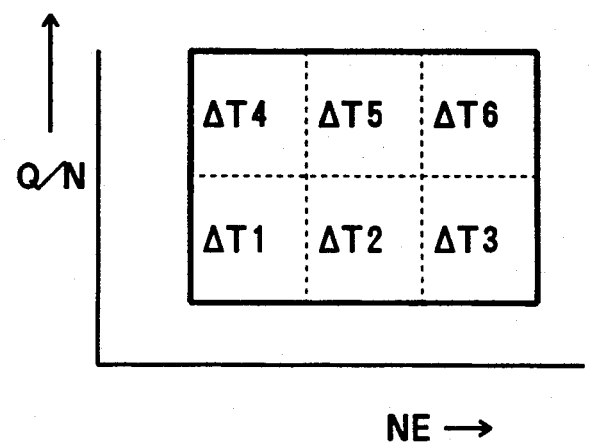
FIG. 15 is a graphical representation of a map of engine load versus engine speed used in calculation by the flow chart of FIG. 14.
Figure 16:
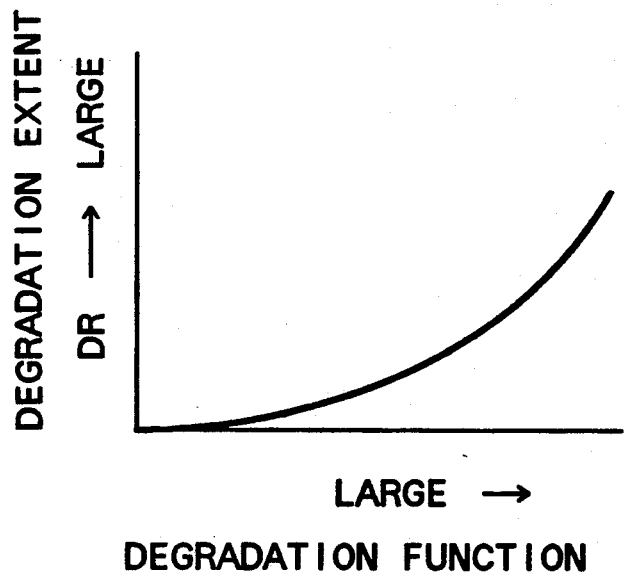
FIG. 16 is a graphical representation of a map of catalyst degradation extent versus catalyst degradation function used in calculation by the flow chart of FIG. 14.

FIG. 14 illustrates a routine for determining degradation of the lean NOx catalyst 6. This routine is entered at intervals of predetermined periods of time, for example, at intervals of fifty milliseconds. At step 602, a determination is made as to whether or not the current engine operating condition is in a catalyst degradation determining condition, for example, in a warmed-up and usual running condition. If the current condition is not in the catalyst degradation determining condition, the routine returns. If the current condition is in the catalyst degradation determining condition, the routine proceeds to step 604, where the current engine load Q/N and the current engine speed NE are entered. Then, at step 606, a predetermined reference temperature difference (delta Ti) between the inlet gas and the outlet gas of the lean NOx catalyst 6, which corresponds to the engine load and engine speed conditions, is read from a map of FIG. 15.

Then, at step 608, the difference between the current inlet gas temperature t1 (output of the temperature sensor 24) and the current outlet gas temperature t2 (output of the temperature sensor 20) of the lean NOx catalyst 6 is calculated using the equation delta t=t2−t1. Then, at step 610, a catalyst degradation function D is calculated as a difference between the current temperature difference delta t and the reference temperature difference delta Ti using the equation D=delta Ti−delta t. Then, at step 612, a catalyst degradation extent DR is calculated using a map of DR versus D map of FIG. 16. In this instance, the steps 604 through 612 and FIG. 16 constitute the means for determining degradation of the lean NOx catalyst 6 in the third embodiment.

Figure 17:
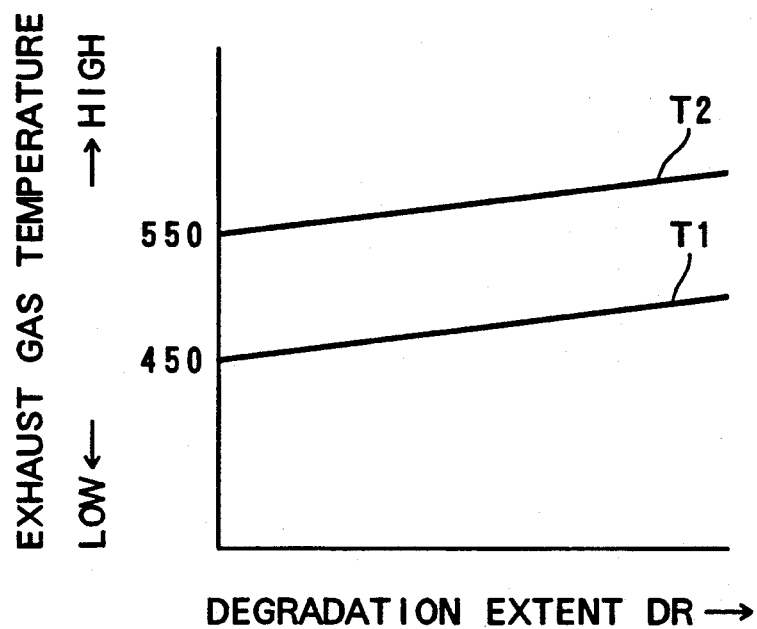
FIG. 17 is a graphical representation of a map of exhaust gas temperature versus catalyst degradation used in calculation by the flow chart of FIG. 14.
Figure 18:
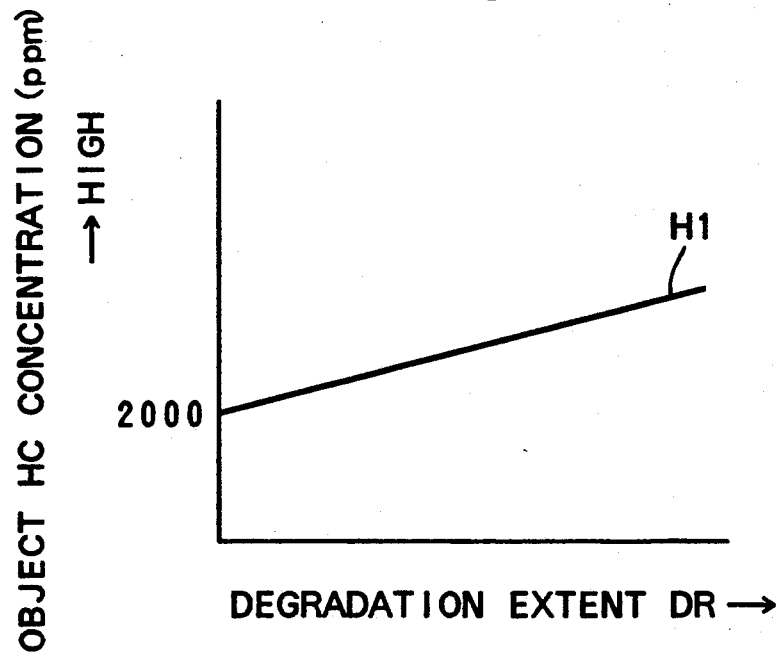
FIG. 18 is a graphical representation of a map of object HC concentration versus catalyst degradation extent used in calculation by the flow chart of FIG. 14.

Then, at step 614, a lower limit T1 and an upper limit T2 of an object temperature range for the catalyst 6 are calculated based on the catalyst degradation extent DR using a map of object temperature range versus catalyst degradation extent of FIG. 17. In FIG. 17, there is a relationship between the temperatures T1 and T2 and the degradation extent DR such that the larger the value DR is, the higher the temperatures T1 and T2 are. Then, at step 616, the lower limit of the object temperature range TC is replaced by the calculated T1 and the upper limit of the range TH is replaced by T2. The control of catalyst temperature is executed according to the routine of FIG. 4 which was discussed. Then, the routine proceeds to step 618, where an object HC concentration H1 is calculated using the map of H1 versus DR of FIG. 18. In FIG. 18, there is a relationship between the object HC concentration H1 and the degradation extent DR such that the larger the DR is, the higher the HC concentration H1 is. At step 620, the object HC concentration HT is replaced by the calculated H1. The control of the HC amount is executed using the routine of FIG. 5 which was discussed. In this instance, the steps 618 and 620 and FIG. 18 constitute the means for increasing the amount of hydrocarbons supplied to the lean NOx catalyst 6 in the third embodiment. Further, the steps 614 and 616 and FIG. 17 constitute the means for increasing the catalyst temperature when the catalyst 6 has been degraded in the third embodiment.

FOURTH EMBODIMENT

An exhaust gas purification system for an internal combustion engine of a fourth embodiment is illustrated in FIGS. 1-7. The system according to the fourth embodiment has the same structure and operation as those of the exhaust gas purification system of the first embodiment except that the means for changing a catalyst temperature to a higher temperature side is essential in the fourth embodiment while such means was not absolutely essential in the first embodiment. In contrast, the means for increasing the amount of hydrocarbons supplied to the catalyst 6 was essential in the first embodiment, while such means is not absolutely essential in the fourth embodiment. Further, in the fourth embodiment, means for determining degradation of the lean NOx catalyst 6 determines degradation of the catalyst 6 based on an accumulated running distance of an automobile to which the engine 2 is mounted, as in the first embodiment.

Due to this structure, in the fourth embodiment, the catalyst temperature is shifted to a higher temperature side when the means for determining degradation of the lean NOx catalyst 6 determines that the catalyst 6 has been degraded. As a result, the maximum NOx purification rate of the catalyst 6 can be used even after the catalyst 6 has been degraded, so that decrease of the NOx purification rate of the lean NOx catalyst 6 is suppressed.

FIFTH EMBODIMENT

An exhaust gas purification system for an internal combustion engine of a fifth embodiment is illustrated in FIGS. 6 and 8-13. The system according to the fifth embodiment has the same structure and operation as the exhaust gas purification system of the second embodiment except that the means for changing a catalyst temperature to a higher temperature side is essential in the fifth embodiment while such means was not absolutely essential in the second embodiment. In contrast, the means for increasing the amount of hydrocarbons supplied to the catalyst 6 was essential in the second embodiment, while such means is not absolutely essential in the fifth embodiment. Further, in the fifth embodiment, means for determining degradation of the lean NOx catalyst 6 studies and determines degradation of the catalyst 6 based on an accumulated running distance of an automobile to which the engine 2 is mounted, as in the second embodiment.

Due to this structure, in the fifth embodiment, the catalyst temperature is shifted to a higher temperature side when the means for determining degradation of the lean NOx catalyst 6 determines that the catalyst 6 has been degraded. As a result, the maximum NOx purification rate of the catalyst 6 can be used even after the catalyst 6 has been degraded, so that decrease of the NOx purification rate of the lean NOx catalyst 6 is suppressed.

SIXTH EMBODIMENT

An exhaust gas purification system for an internal combustion engine in accordance with a sixth embodiment is illustrated in FIGS. 19 and 20. The internal combustion engine 2, the exhaust conduit 4, the lean NOx catalyst 6, the inlet gas temperature sensor 24, and the outlet gas temperature sensor 20 illustrated in FIG. 6 are applicable to the sixth embodiment. Further, a cooling water temperature sensor 32 and a muffler 30 are provided.

As illustrated in FIG. 20, in the sixth embodiment, a catalyst temperature control device includes an air pump 34 driven by the engine 2, an air nozzle 26 for injecting air from the air pump 34 against a converter case housing the lean NOx catalyst 6, and a control valve 28 installed in an air conduit connecting the air pump 34 and the air nozzle 26. The amount of air injected from the air nozzle 26 is controlled by the air control valve 28 which is controlled by the ECU 10.

A routine (FIG. 19) for controlling the amount of cooling air is stored in the ROM of the ECU 10 and the routine is executed in the CPU of the ECU 10. This routine of FIG. 19 is entered at intervals of predetermined periods of time, for example, at intervals of fifty milliseconds. At step 702, the output of the cooling water temperature sensor 32 is entered and it is determined whether or not the engine is being warmed based on the cooling water temperature. For example, when the cooling water temperature is equal to or lower than 90° C., the engine condition is determined to be during a warming condition. When the engine is determined to be during a warming condition at step 702, the routine proceeds to step 710 to close the air control valve 28 to stop air injection because the lean NOx catalyst 6 should be warmed-up quickly in such a condition.

When the engine is determined to have finished warming-up at step 702, the routine proceeds to step 704 where a determination is made as to whether or not the current engine operating condition is in a condition in which engine cooling is allowed. For example, if the current engine operating condition is not in an idling condition, the engine operating condition may be deemed to be an engine cooling allowable condition, and the routine proceeds to step 710 where the air control valve 28 is closed. Contrarily, if the current engine operating condition is in an engine cooling allowable condition at step 704, the routine proceeds to step 706.

At step 706, a difference between the output TI of the inlet gas temperature sensor 24 and the output TE of the outlet gas temperature sensor 20 is calculated, and it is determined whether or not the temperature difference is larger than a predetermined value TA. When the temperature difference is equal to or less than TA, the lean NOx catalyst 6 is deemed to have been degraded. In this instance, the step 706 of FIG. 19 constitutes means for determining degradation of the lean NOx catalyst 6 of the sixth embodiment.

When it is determined at step 706 that the lean NOx catalyst 6 has been degraded, the routine proceeds to step 710 where the air control valve 28 is closed so that cooling of the catalyst 6 is stopped and the catalyst temperature is changed to a higher side. In this instance, the step 710 of FIG. 19 constitutes means for changing a catalyst temperature to a higher side in the sixth embodiment. When it is determined at step 706 that the lean NOx catalyst 6 has not yet been degraded, the routine proceeds to step 708 where the air control valve 28 is opened so that the catalyst 6 is cooled. Other structures and operation of the sixth embodiment are the same as those of the first embodiment of the invention.

In accordance with any embodiment of the invention, when it is determined by the means for determining degradation of a catalyst, that the catalyst 6 has been degraded, either the amount of HC supplied to the catalyst 6 is increased by the means for increasing the amount of HC or the catalyst temperature is changed to a higher side by the means for changing the catalyst temperature, so that, in either case, the NOx purification rate of the catalyst 6 is maintained to be high even after the catalyst 6 has been degraded.

Although six embodiments of the invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. An exhaust gas purification system for an internal combustion engine comprising:
   an internal combustion engine capable of fuel combustion at lean air-fuel ratios and having an exhaust conduit;
   a catalyst installed in the exhaust conduit of the engine and constructed of zeolite, said catalyst carrying at least one metal selected from the group consisting of transition metals and noble metals to reduce nitrogen oxides included in exhaust gas from the engine under oxidizing gas conditions and in the presence of hydrocarbons;
   means for determining degradation of the catalyst; and
   means for increasing the amount of hydrocarbons supplied to the catalyst when the means for determining degradation of the catalyst determines that the catalyst has been degraded.

2. An exhaust gas purification system for an internal combustion engine according to claim 1, further comprising an exhaust gas temperature control device installed in a portion of the exhaust conduit upstream of the catalyst.

3. An exhaust gas purification system for an internal combustion engine according to claim 1, and further comprising a hydrocarbon supply device which includes a hydrocarbon source, a hydrocarbon supply port for introducing the hydrocarbons from the hydrocarbon source into a portion of the exhaust conduit upstream of the catalyst, and a control valve, installed in a conduit connecting the hydrocarbon source and the hydrocarbon supply port, for controlling the amount of hydrocarbons supplied into the exhaust conduit.

4. An exhaust gas purification system for an internal combustion engine according to claim 1, wherein the means for determining degradation of the catalyst includes:
   a first temperature sensor installed in a portion of the exhaust conduit upstream of the catalyst;
   a second temperature sensor installed in a portion of the exhaust conduit downstream of the catalyst; and
   an $NO_x$ sensor installed in the portion of the exhaust conduit downstream of the catalyst.

5. An exhaust gas purification system for an internal combustion engine according to claim 1, wherein the means for determining degradation of the catalyst comprises means for determining degradation of the catalyst based on an accumulated running distance of an automobile to which the engine is mounted.

6. An exhaust gas purification system for an internal combustion engine according to claim 5, wherein the means for increasing the amount of hydrocarbons includes means for calculating an object amount of hydrocarbons to be supplied to the catalyst such that the larger the accumulated running distance is, the more the object amount of hydrocarbons to be supplied to the catalyst is.

7. An exhaust gas purification system for an internal combustion engine according to claim 5, further comprising catalyst temperature changing means for calculating upper and lower limits of an object catalyst temperature range such that the more catalyst has been degraded, the higher the upper and lower limits of the object catalyst temperature range are.

8. An exhaust gas purification system for an internal combustion engine according to claim 1, wherein the means for determining degradation of the catalyst comprises means for modifying a reference NOx value by a current detected NOx amount and storing the modified reference NOx value until an accumulated running distance of an automobile to which the engine is mounted finally reaches a predetermined value, and means for calculating a NOx value difference between a current detected NOx amount and the stored reference NOx value to determine a degradation extent of the catalyst based on the NOx value difference.

9. An exhaust gas purification system for an internal combustion engine according to claim 8, wherein the means for increasing the amount of hydrocarbons supplied to the catalyst includes means for calculating an object hydrocarbon concentration based on the calculated NOx value difference such that the larger the calculated NOx value differnce is, the higher the object hydrocarbon concentration is.

10. An exhaust gas purification system for an internal combustion engine according to claim 8, further comprising means for calculating a catalyst temperature modification factor based on the calculated NOx value difference such that the larger the calculated NOx value difference is, the larger the catalyst temperature modification factor is, and means for controlling an object exhaust gas temperature based on the calculated catalyst temperature modification factor such that the larger the calculated catalyst temperature modification factor is, the higher the object exhaust gas temperature is.

11. An exhaust gas purification system for an internal combustion engine according to claim 1, wherein the means for determining degradation of the catalyst includes means for calculating a reference temperature difference between inlet gas and outlet gas of the catalyst at a non-degraded state from an engine load versus engine speed map, detecting a current temperature difference between the inlet gas and the outlet gas of the catalyst, and calculating a degradation extent of the catalyst based on a difference between the detected current temperature difference and the reference temperature difference.

12. An exhaust gas purification system for an internal combustion engine according to claim 11, wherein the means for increasing the amount of hydrocarbons supplied to the catalyst includes means for calculating an object hydrocarbon concentration based on the calculated degradation extent of the catalyst such that the larger the calculated degradation extent of the catalyst is, the higher the object hydrocarbon concentration is.

13. An exhaust gas purification system for an internal combustion engine according to claim 11, further comprising catalyst temperature changing means for calculating upper and lower limits of an object catalyst temperature range based on the calculated degradation extent of the catalyst such that the larger the calculated degradation extent of the catalyst is, the higher the upper and lower limits of the object catalyst temperature range are.

14. An exhaust gas purification system for an internal combustion engine comprising:
- an internal combustion engine capable of fuel combustion at lean air-fuel ratios and having an exhaust conduit;
- a catalyst installed in the exhaust conduit of the engine and constructed of zeolite, said catalyst carrying at least one metal selected from the group consisting of transition metals and noble metals to reduce nitrogen oxides included in exhaust gas from the engine under oxidizing gas conditions and in the presence of hydrocarbons;
- means for determining degradation of the catalyst; and
- means for changing a catalyst temperature to a higher side when the means for determining degradation of the catalyst determines that the catalyst has been degraded.

15. An exhaust gas purification system for an internal combustion engine according to claim 14, further comprising an exhaust gas temperature control device installed in a portion of the exhaust conduit upstream of the catalyst.

16. An exhaust gas purification system for an internal combustion engine according to claim 14, further comprising a hydrocarbon supply device which includes a hydrocarbon source, a hydrocarbon supply port for introducing the hydrocarbons from the hydrocarbon source into a portion of the exhaust conduit upstream of the catalyst, and a control valve, installed in a conduit connecting the hydrocarbon source and the hydrocarbon supply port, for controlling the amount of hydrocarbons supplied into the exhaust conduit.

17. An exhaust gas purification system for an internal combustion engine according to claim 14, wherein the means for determining degradation of the catalyst includes:
- a first temperature sensor installed in a portion of the exhaust conduit upstream of the catalyst;
- a second temperature sensor installed in a portion of the exhaust conduit downstream of the catalyst; and
- an $NO_x$ sensor installed in the portion of the exhaust conduit downstream of the catalyst.

18. An exhaust gas purification system for an internal combustion engine according to claim 14, wherein the means for determining degradation of the catalyst comprises means for determining degradation of the catalyst based on an accumulated running distance of an automobile to which the engine is mounted.

19. An exhaust gas purification system for an internal combustion engine according to claim 14, wherein the means for determining degradation of the catalyst comprises means for modifying a reference NOx value by a current detected NOx amount and storing the modified reference NOx value until an accumulated running distance of an automobile to which the engine is mounted reaches a predetermined value, and means for calculating an NOx value difference between a current detected NOx amount and the stored reference NOx value to determine a degradation extent of the catalyst based on the NOx value difference.

20. An exhaust gas purification system for an internal combustion engine according to claim 14, wherein the exhaust gas temperature control device includes an air pump, an air nozzle for injecting air from the air pump to a converter case housing the catalyst therein, and a control valve installed in an air conduit connecting the air pump and the air nozzle.

21. An exhaust gas purification system for an internal combustion engine according to claim 20, wherein the means for determining degradation of the catalyst includes means which determines that the catalyst has been degraded when a temperature difference between inlet gas and outlet gas of the catalyst exceeds a predetermined value.

22. An exhaust gas purification system for an internal combustion engine according to claim 21, wherein the means for changing a catalyst temperature includes means for closing the control valve when the means for determining degradation of the catalyst determines that the catalyst has been degraded.

* * * * *